(12) United States Patent
Benevelli et al.

(10) Patent No.: US 10,111,391 B2
(45) Date of Patent: *Oct. 30, 2018

(54) AGRICULTURAL BALER WITH AUXILIARY POWER SYSTEM FOR POWERING VARIOUS FUNCTIONAL COMPONENTS ONBOARD THE BALER

(71) Applicant: CNH Industrial America LLC, New Holland, PA (US)

(72) Inventors: Alessandro Benevelli, Albinea (IT); Didier Verhaeghe, Ypres (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/401,751

(22) Filed: Jan. 9, 2017

(65) Prior Publication Data

US 2017/0142906 A1 May 25, 2017

Related U.S. Application Data

(63) Continuation of application No. PCT/EP2015/065331, filed on Jul. 6, 2015.

(30) Foreign Application Priority Data

Jul. 9, 2014 (BE) .................................. 2014/0544

(51) Int. Cl.
*A01F 15/08* (2006.01)
*A01F 15/04* (2006.01)

(52) U.S. Cl.
CPC ................................ *A01F 15/0841* (2013.01)

(58) Field of Classification Search
CPC ... A01F 15/0841; B30B 9/3007; B30B 9/305; A01D 69/02; A01D 69/002; A01D 69/025
See application file for complete search history.

(56) References Cited

U.S. PATENT DOCUMENTS 3,139,969 A * 7/1964 Sullivan ............... A01D 87/125
 100/188 BT
2003/0167939 A1 9/2003 Roth
(Continued)

FOREIGN PATENT DOCUMENTS

CA 2252046 A1 * 9/1999 ........... A01F 15/042
EP 1433648 A2 * 6/2004 ............... B60K 6/12
(Continued)

OTHER PUBLICATIONS

Belgium Search Report dated May 4, 2015 for Belgium Application No. 2014/0544 (9 pages).

(Continued)

*Primary Examiner* — John Weiss
(74) *Attorney, Agent, or Firm* — Peter K. Zacharias; Patrick M. Sheldrake

(57) ABSTRACT

An agricultural baler includes a chassis, a flywheel carried by the chassis, and a driveline associated with the flywheel and couplable with a PTO of a traction unit. The baler is characterized by an auxiliary power system coupled with the driveline. The auxiliary power system is configured for receiving power from the driveline, storing the power, and utilizing the stored power to power at least one functional component onboard the baler.

11 Claims, 5 Drawing Sheets

(56) References Cited

U.S. PATENT DOCUMENTS

| | | | |
|---|---|---|---|
| 2008/0127839 A1* | 6/2008 | Fahrenbach | B30B 1/14 100/214 |
| 2010/0108413 A1* | 5/2010 | Lang | A01F 15/0841 180/53.1 |
| 2013/0152805 A1* | 6/2013 | Roth | A01F 15/0841 100/35 |
| 2014/0137757 A1* | 5/2014 | Nelson | A01F 15/0841 100/102 |
| 2015/0027325 A1* | 1/2015 | Bonte | A01F 15/0841 100/35 |

FOREIGN PATENT DOCUMENTS

| | | | | |
|---|---|---|---|---|
| EP | 1 974 601 A1 | 10/2008 | | |
| EP | 1974601 A1 * | 10/2008 | | A01F 15/0841 |
| EP | 2183955 A1 * | 5/2010 | | A01D 41/1274 |

OTHER PUBLICATIONS

International Search Report and Written Opinion dated Sep. 8, 2015 for International Application No. PCT/EP2015/065331 (7 pages).

* cited by examiner

AGRICULTURAL BALER WITH AUXILIARY POWER SYSTEM FOR POWERING VARIOUS FUNCTIONAL COMPONENTS ONBOARD THE BALER

CROSS REFERENCE TO RELATED APPLICATIONS

This is a continuation of PCT application No. PCT/EP2015/065331, entitled "AGRICULTURAL BALER WITH AUXILIARY POWER SYSTEM FOR POWERING VARIOUS FUNCTIONAL COMPONENTS ONBOARD THE BALER", filed Jul. 6, 2015, which is incorporated herein by reference.

BACKGROUND OF THE INVENTION

Field of the Invention

The present invention relates to agricultural balers, and, more particularly, to systems for powering such balers.

Description of the Related Art

Agricultural harvesting machines, such as balers, are used to consolidate and package crop material so as to facilitate the storage and handling of the crop material for later use. In the case of hay, a mower-conditioner is typically used to cut and condition the crop material for windrow drying in the sun. In the case of straw, an agricultural combine discharges non-grain crop material from the rear of the combine defining the straw (such as wheat or oat straw) which is to be picked up by the baler. The cut crop material is typically raked and dried, and a baler, such as a large square baler or round baler, straddles the windrows and travels along the windrows to pick up the crop material and form it into bales.

On a large square baler, a pickup unit at the front of the baler gathers the cut and windrowed crop material from the ground. The pickup unit includes a pickup roll, and optionally may include other components such as side shields, stub augers, wind guard, etc.

A packer unit is used to move the crop material from the pickup unit to a duct or pre-compression chamber. The packer unit forms a wad of crop within the pre-compression chamber which is then transferred to a main bale chamber. (For purposes of discussion, the charge of crop material within the pre-compression chamber will be termed a "wad", and the charge of crop material after being compressed within the main bale chamber will be termed a "flake"). Typically such a packer unit includes packer tines or forks to move the crop material from the pickup unit into the pre-compression chamber. Instead of a packer unit it is also known to use a rotor cutter unit which chops the crop material into smaller pieces.

A stuffer unit transfers the wad of crop material in charges from the pre-compression chamber to the main bale chamber. Typically such a stuffer unit includes stuffer forks which are used to move the wad of crop material from the pre-compression chamber to the main bale chamber, in sequence with the reciprocating action of a plunger within the main bale chamber.

In the main bale chamber, the plunger compresses the wad of crop material into flakes to form a bale and, at the same time, gradually advances the bale toward the outlet of the bale chamber. The plunger reciprocates, back and forth, toward and away from the discharge end of the baler. The plunger may include a number of rollers which extend laterally outward from the sides of the plunger. The rollers on each side of the plunger are received within a respective plunger slot formed in the side walls of the bale chamber, with the plunger slots guiding the plunger during the reciprocating movements.

When enough flakes have been added and the bale reaches a full (or other predetermined) size, a number of knotters are actuated which wrap and tie twine, cord or the like around the bale while it is still in the main bale chamber. The twine is cut and the formed baled is ejected out the back of the baler as a new bale is formed.

As balers historically become larger and larger, the power requirements for the plunger and various other components and functions onboard the baler likewise increase. The usual base source of power on balers is the power take-off (PTO) shaft from the traction unit (e.g., tractor), and increasing the power requirements in turn increases the loads placed on the PTO shaft from the traction unit. These large loads can place excessive loads on the PTO shaft, which then may lug down the internal combustion (IC) engine onboard the traction unit which ultimately drives the PTO shaft.

US 2010/0108413 describes a baler having a jog drive system drivingly connected within the primary drive system. This jog drive system serves as a source of power to the various performance systems in the baler when movement of components within the baler is required for maintenance or adjustment. The jog drive system comprises a jog motor which can be in the form of a hydraulic motor, an electric motor or other suitable drive mechanism for slowly rotating the flywheel of the baler and thereby advancing all performance systems. The jog motor can be connected to a hydraulic system of the tractor, to an electric system of the tractor or can be provided with other sources of power input. This jog drive system is foreseen to assist the operator when maintenance or adjustment is needed to the baler, and does not have an impact on the operation of the plunger, since the jog drive system is only able to slowly rotate the flywheel.

In EP 1 974 601, a similar auxiliary drive is foreseen which functions as a starting arrangement acting on the main drive of the baler and which is capable of acting as a sole drive of the baler or as a drive assisting the main drive in the first phase of the process of starting the baler. During the starting process, the main drive will accelerate to a higher speed than the auxiliary drive by means of a freewheel arrangement, whereupon the auxiliary drive ceases to have any effect on the remainder of the starting process. This auxiliary drive is used to overcome the problem that sometimes it is difficult to start up the baler and will assist only during this start-up phase, after which it ceases to have any effect.

What is needed in the art is an agricultural baler which accommodates large loads on a baler.

SUMMARY OF THE INVENTION

The present invention provides an agricultural baler with an auxiliary power system (APS) which scavenges power from the driveline of the baler during off-peak load periods, stores the power in the APS, and uses the stored power to power various functional components onboard the baler.

The invention in one form is directed to an agricultural baler including a chassis, a flywheel carried by the chassis, and a driveline associated with the flywheel and couplable with a PTO of a traction unit. The baler is characterized by an APS coupled with the driveline. The APS is configured for receiving power from the driveline, storing the power, and utilizing the stored power to power at least one functional component onboard the baler.

An advantage of the present invention is that the baler uses scavenged and stored power to power one or more functional components onboard the baler, thereby reducing the loads placed on the PTO shaft.

Another advantage is that the stored power can be in the form of hydraulic and/or electrical power which is used to drive the various functional components.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
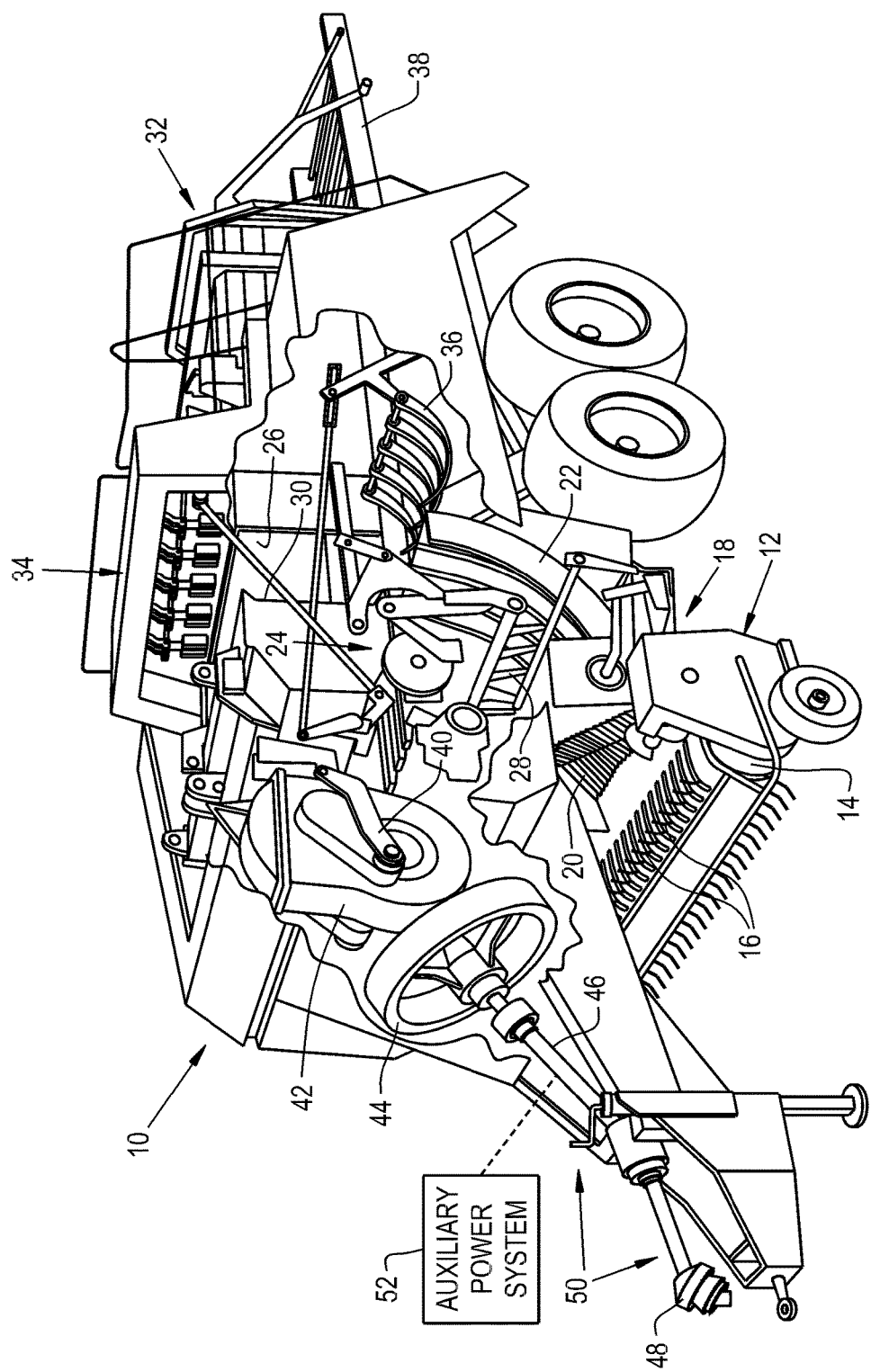
FIG. 1 is a perspective cutaway view showing the internal workings of a large square baler, which may include an APS of the present invention.

Referring now to the drawings, and more particularly to FIG. 1, there is shown a perspective cutaway view showing the internal workings of a large square baler 10. Baler 10 operates on a two stage feeding system. Crop material is lifted from windrows into the baler 10 using a pickup unit 12. The pickup unit 12 includes a rotating pickup roll 14 with tines 16 which move the crop rearward toward a packer unit 18. An optional pair of stub augers (one of which is shown, but not numbered) are positioned above the pickup roll 14 to move the crop material laterally inward. The packer unit 18 includes packer tines 20 which push the crop into a pre-compression chamber 22 to form a wad of crop material. The packer tines 20 intertwine the crop together and pack the crop within the pre-compression chamber 22. Pre-compression chamber 22 and packer tines 20 function as the first stage for crop compression. Once the pressure in the pre-compression chamber 22 reaches a predetermined sensed value, a stuffer unit 24 moves the wad of crop from the pre-compression chamber 22 to a main bale chamber 26. The stuffer unit 24 includes stuffer forks 28 which thrust the wad of crop directly in front of a plunger 30, which reciprocates within the main bale chamber 26 and compresses the wad of crop into a flake. Stuffer forks 28 return to their original stationary state after the wad of material has been moved into the main bale chamber 26. Plunger 30 compresses the wads of crop into flakes to form a bale and, at the same time, gradually advances the bale toward outlet 32 of main bale chamber 26. Main bale chamber 26 and plunger 30 function as the second stage for crop compression. When enough flakes have been added and the bale reaches a full (or other predetermined) size, knotters 34 are actuated which wrap and tie twine around the bale while it is still in the main bale chamber 26. Needles 36 bring the lower twine up to the knotters 34 and the tying process then takes place. The twine is cut and the formed bale is ejected from a discharge chute 38 as a new bale is formed.

Plunger 30 is connected via a crank arm 40 with a gear box 42. Gear box 42 is driven by a flywheel 44, which in turn is connected via a drive shaft 46 with the power take-off (PTO) coupler 48. The PTO coupler 48 is detachably connected with the PTO spline at the rear of the traction unit, such as a tractor (not shown). PTO coupler 48, drive shaft 46 and flywheel 44 together define a portion of a driveline 50 which provides rotative power to gearbox 42. Flywheel 44 has a sufficient mass to carry plunger 30 through a compression stroke as power is applied to drive shaft 46 by the traction unit. Without the flywheel, a large mechanical load (impulse) is placed on the traction unit as peak power is required by the baler during operation, such as at the end of a compression stroke and/or during a stuffer unit stroke. Generally speaking, as balers become increasingly larger the size of the flywheel also becomes increasingly larger. A larger flywheel also in turn typically requires the use of a traction unit with a higher horsepower rating, to maintain input power to the drive shaft 46 during operation, and since higher power is required to start rotation of the flywheel from an at-rest position.

Figure 2:
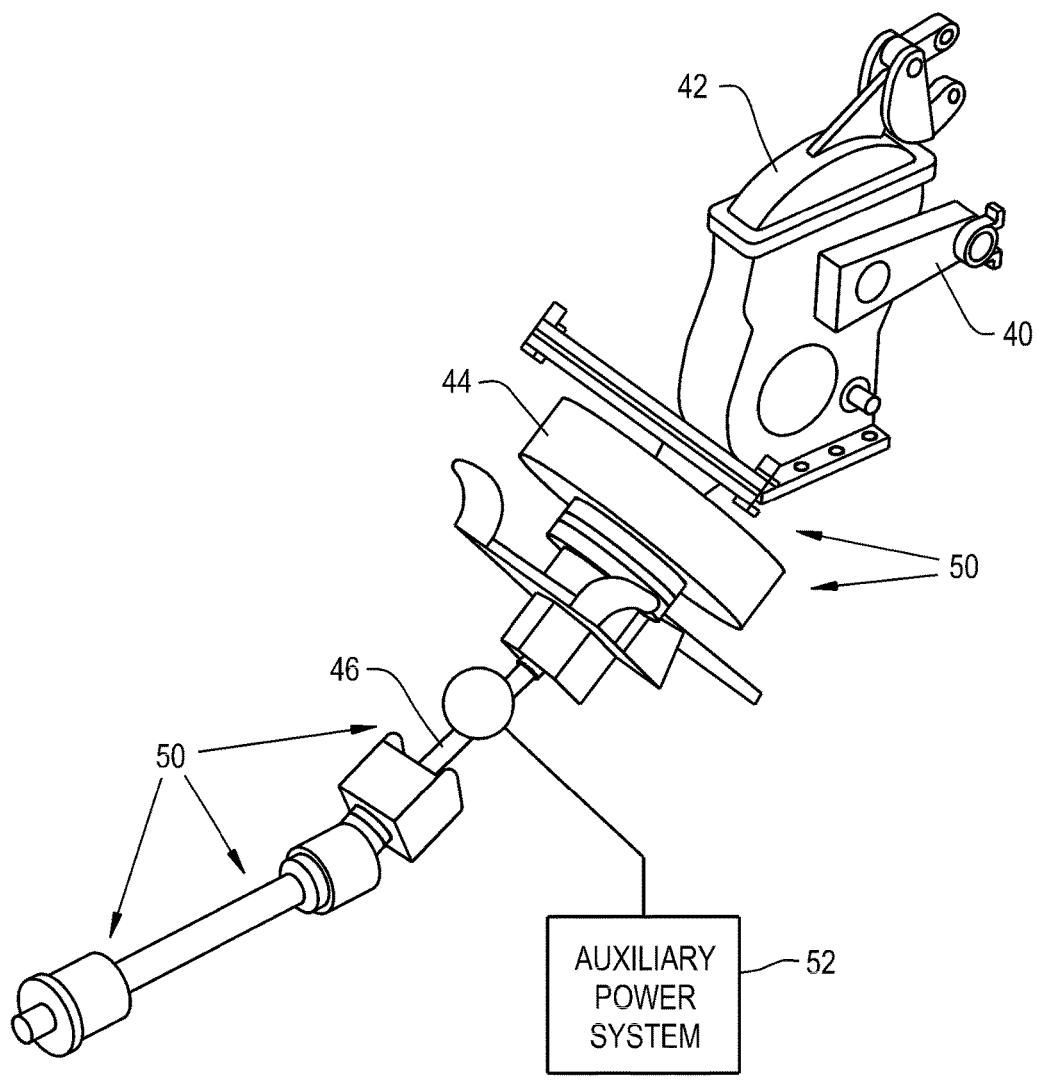
FIG. 2 is a perspective view of the driveline, gearbox and APS shown in FIG. 1.
Figure 3:
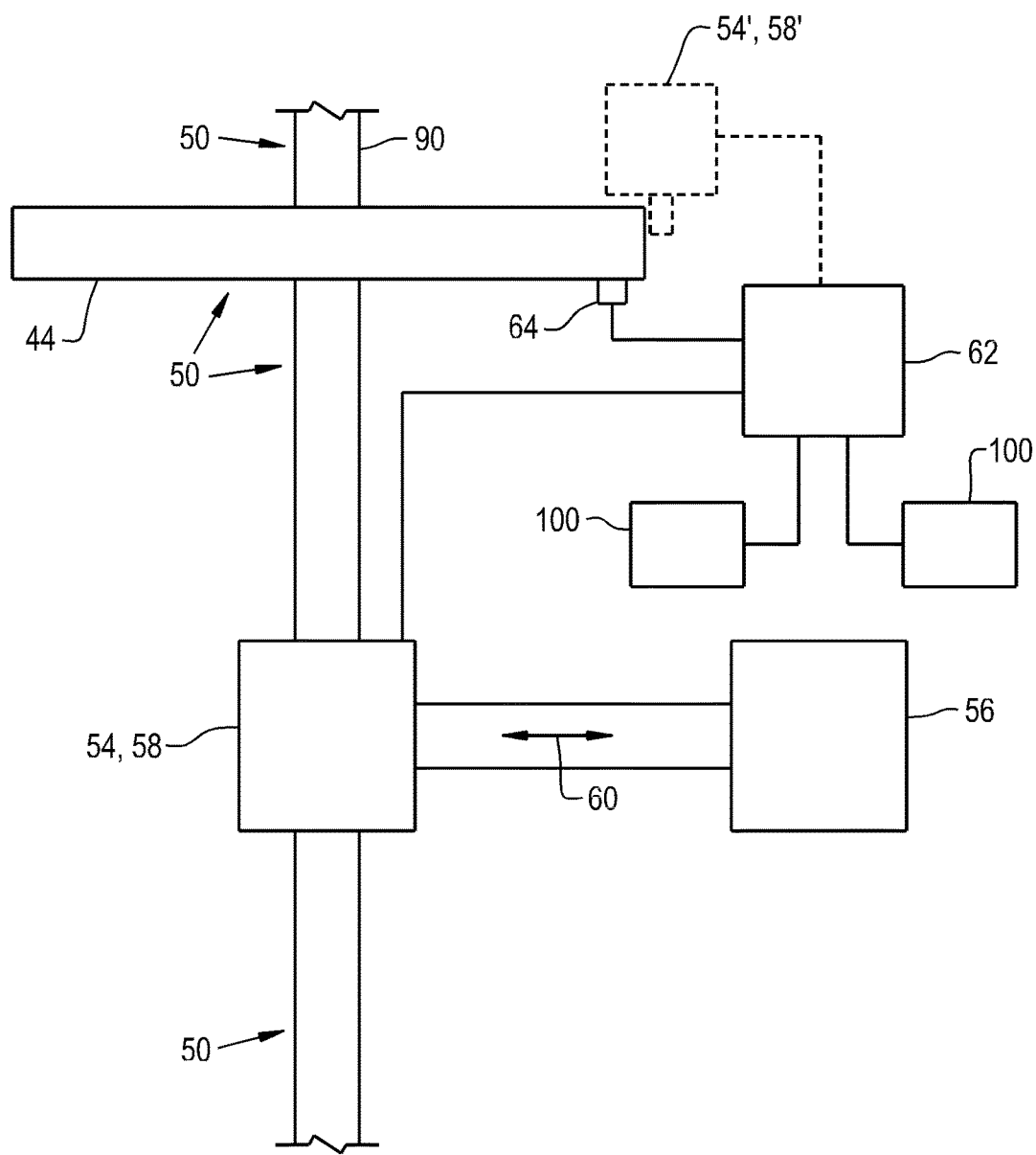
FIG. 3 is a block diagram showing a simplified embodiment of the APS of the present invention.

Referring now to FIGS. 1-3, conjunctively, baler 10 also includes an auxiliary power system (APS) 52 which is coupled with the driveline 50 in parallel with the flywheel 44, in a mechanical power distribution sense and not necessarily a geometric sense. The APS 52 generally functions to receive power from the driveline 50, store the power, and transmit the stored power back to the driveline 50.

APS 52 generally includes a power generation device 54 for receiving power from the driveline 50 and generating power, a power storage device 56 coupled with and storing power from the power generation device 54, and a power feedback device 58 for transmitting the stored power back to the driveline. In the block diagram shown in FIG. 3, the power generation device 54 and the power feedback device 58 are configured as the same unit which can operate with different functionality, such as a hydraulic pump/motor or an electric motor/generator. When configured as a hydraulic pump/motor, the power storage device 56 can be in the form of one or more hydraulic accumulators.

Alternatively, when configured as an electric motor/generator, the power storage device 56 can be in the form of one or more ultracapacitors and/or batteries. With this type of dual functionality, the power storage device 56 is connected with the power generation device 54/power feedback device 58 in a bidirectional manner allowing 2-way flow of power, as indicated by double headed arrow 60.

Alternatively, the power generation device 54 and the power feedback device 58 can be separate and discrete units which are each coupled with the driveline 50 and power storage device 56. For example, the power generation device 54 can be in the form of a hydraulic pump, and the power feedback device 58 can be in the form of a separate hydraulic motor, each of which are mechanically coupled with the driveline 50 and hydraulically coupled with a power storage device in the form of an accumulator (not specifically shown). Moreover, the power generation device 54 can be in the form of an electric motor, and the power feedback device 58 can be in the form of a separate electric generator, each of which are mechanically coupled with the driveline 50 and electrically coupled with a power storage device 56 in the form of an ultracapacitor and/or battery (not specifically shown).

The power storage device 56 shown in FIG. 3 can also be configured differently than one or more hydraulic accumulators, ultracapacitors and/or batteries. For example, the power storage device 56 can be configured as an additional mechanical flywheel which receives/transmits power from/to the driveline 50. The power generation device 54 and the power feedback device 58 can be configured as a continuously variable transmission (CVT), and the additional flywheel would somehow be capable of receiving and storing power during off-peak load periods and transferring the power back to the driveline 50 for use during peak load periods.

For purposes of discussion hereinafter, it will be assumed that the power generation device 54 and the power feedback device 58 are in the form of a singular unit configured as a hydraulic pump/motor. Pump/motor 54, 58 is coupled with and under the control of an electrical processing circuit 62, which can be in the form of an electronic control unit (ECU) or an analog processor. Electrical processing circuit 62 can be a dedicated ECU onboard the baler 10, or can also be part of an ECU used for other purposes onboard the baler 10. Alternatively, electrical processing circuit 62 can also be an ECU onboard the traction unit which tows the baler 10, and can be coupled with the pump/motor 54, 58 and other components onboard baler 10 in a wired or wireless manner.

Electrical processing circuit 62 controls operation of pump/motor 54, 58 in a manner such that power is transmitted to the driveline 50 prior to and during peak load periods on the baler 10, and power is received from the driveline 50 during off-peak load periods on the baler 10. More specifically, power is transmitted to/from the driveline 50 dependent upon a position of the plunger 30 within the main bale chamber 26, and/or a variable associated with the formation of a slice of crop material within the bale chamber 26. To this end, the electrical processing circuit 62 is connected with one or more sensors 64 which provide output signals indicative of the position of the plunger 30 and/or a crop slice variable. In the embodiment shown in FIG. 3, the sensor 64 is positioned adjacent to flywheel 44 to determine the rotational position of the flywheel 44, such as by using a proximity sensor, optical sensor, etc. The position of the flywheel 44 can in turn be used to establish the position of the plunger 30 within the main bale chamber 26. Alternatively, the sensor 64 can be configured to sense a variable associated with crop slice formation within the main bale chamber 26. Examples of crop slice formation variables may include a moisture content of the crop material, a thickness of a given slice of crop material and/or a positional change of the plunger at maximum compression for each slice of the crop material. Alternatively, the variable associated with the crop slice formation can even be input by a user, such as a particular type of crop material being harvested. Other input variables may also be used for controlling operation of APS 52.

Figure 4:
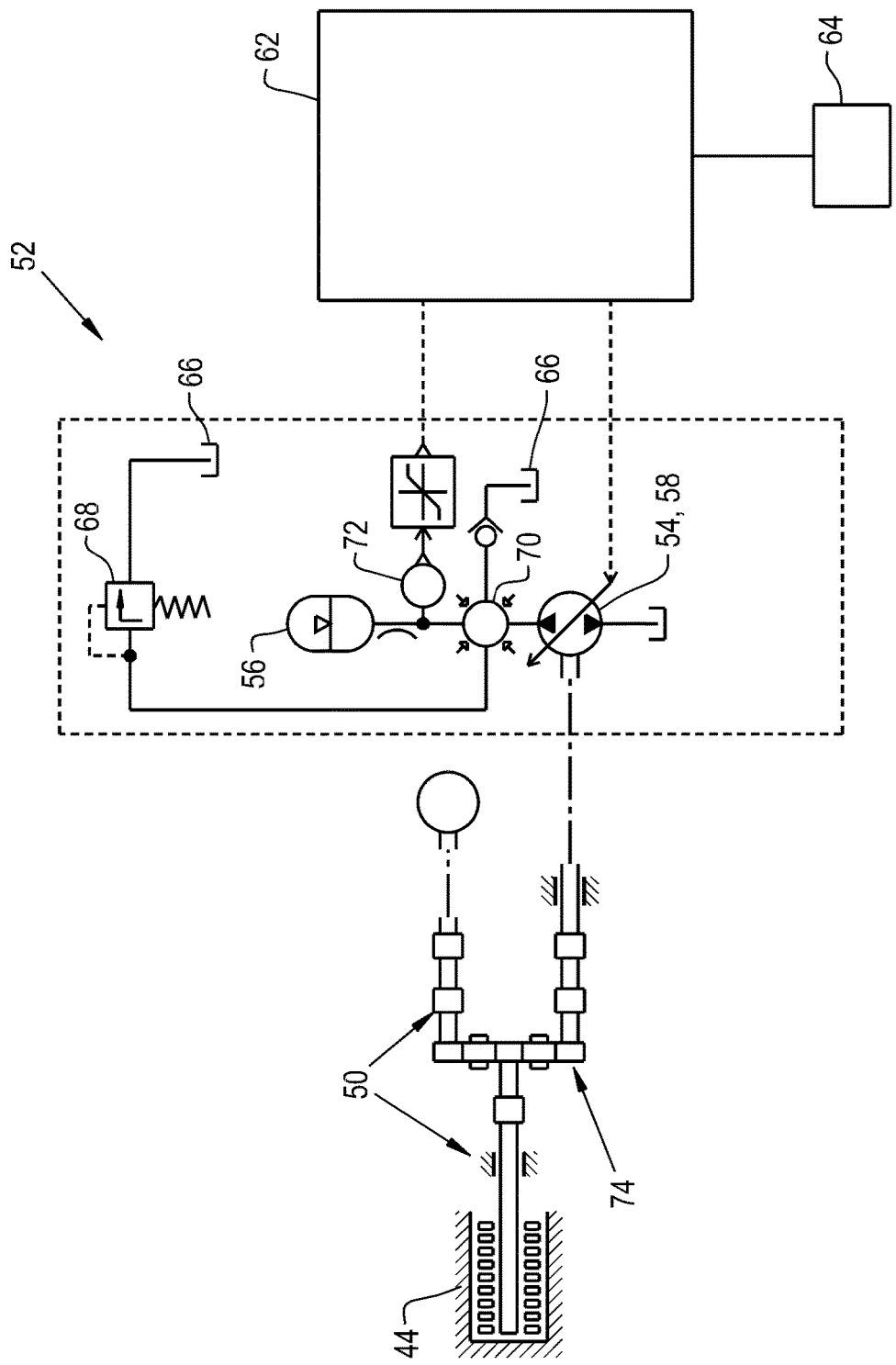
FIG. 4 is a control schematic of an embodiment of the APS of the present invention.
Figure 5:
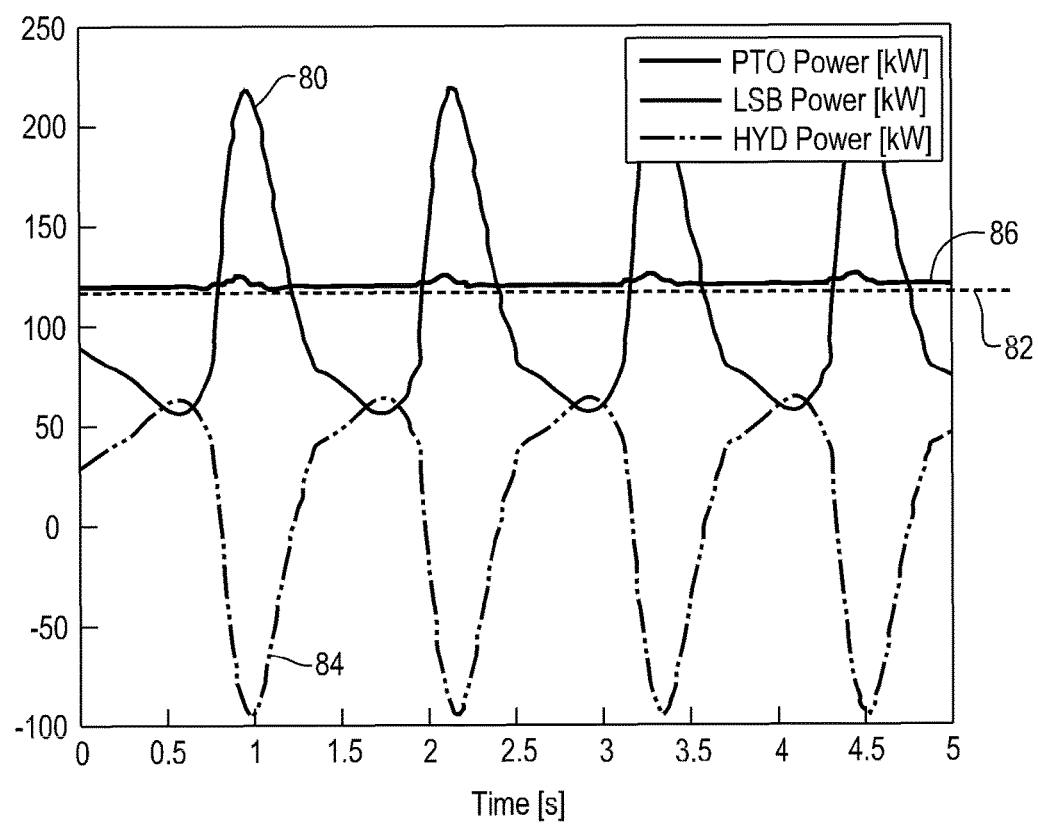
FIG. 5 is a graphical illustration of required power during compression cycles of the baler, hydraulic power input by the APS, and resultant PTO power as a result of the power input by the APS.

Referring now to FIG. 4, there is shown a control schematic of the APS 52 shown in FIGS. 1-3. APS 52 can be thought of as defining a hydraulic flywheel which is based on an over-center variable displacement pump/motor 54, 58 connected between the accumulator 56 and a tank 66. In order to avoid any overpressure, a pressure relief valve 68 is installed between the pump/motor 54, 58 and the accumulator 56. A check valve 70 is also connected to the tank 66 in order to avoid cavitation of the pump/motor 54, 58. A pressure transducer 72 is used to manage the displacement of the pump/motor 54, 58. Basically, during a typical duty cycle, the pump/motor 54, 58 works as a real pump charging the accumulator 56 when the instant power of the baler 10 is lower than the average power (FIG. 5). On the other hand, when the plunger 30 is in a compressing stroke, the pump/motor 54, 58 works as a motor converting hydraulic power into mechanical power that can be provided to the driveline 50. In this way, the typical peak power can be avoided and the PTO power provided from the tractor is always close to the average power. The pump size is a function of the maximum pressure in the accumulator 56 and the operating speed of the pump/motor 54, 58. Because of the additional gearbox 74 coupled with the driveline 50, the pump speed can be increased, e.g., from 1000 RPM (the typical PTO speed during working conditions) up to approximately 2680 RPM. This higher speed allows the use of a smaller pump with a higher hydraulic efficiency and faster response time, in contrast with a larger pump needed when operating at a lower speed condition.

During operation of the baler 10, the plunger 30 reciprocates back and forth during compression cycles within the main bale chamber 26. In the embodiment of the large square baler shown in the graph of FIG. 5, as the plunger 30 reciprocates back and forth (indicated by the top generally sinusoidal curve 80), the power required at the PTO shaft of the large baler can fluctuate between a minimum power requirement up to approximately four times the minimum power requirement (e.g., between approximately 55 and 215 kW). However, the average power indicated by the horizontal dashed line 82 is only about two times the minimum power requirement (e.g., 107 kW). On the other hand, the power provided by the hydraulic pump/motor 54, 58 to the driveline 50 (indicated by the bottom generally sinusoidal curve 84) generally offsets the power fluctuations required at the PTO shaft. Thus, the resultant power required at the PTO shaft is indicated by the generally horizontal line 86 just above the average power line 82.

In the embodiment of APS 52 described above, the system is assumed to be a hydraulic system with a pump/motor 54, 58 connected between the PTO coupler 48 and the flywheel 44. However, the exact location of the connection between the APS 52 and the driveline 50 can vary. For example, referring to FIG. 3, a pump/motor 54', 58' (shown in dashed lines as an optional attachment location) can also engage splines or gear teeth (not shown) formed at the periphery of flywheel 44. As a further example, a pump/motor can be connected with an input shaft 90 of gearbox 42. Thus, it is apparent that wherever power can be scavenged along the length of driveline 50, APS 52 can be coupled with the driveline 50 for transmitting power to/from the driveline 50, in a manner as described above.

According to another aspect of the present invention, and referring again to FIG. 3, the power that is stored in the power storage device 56 can be used to power various functional components 100 onboard the baler 10. With conventional baler designs, any functional component which is driven onboard the baler 10 is powered either directly or indirectly through the PTO shaft. These various functional components, taken together as a whole, can place significant loads on the PTO shaft, and in turn the IC engine onboard the traction unit.

The APS 52 can scavenge power from any movable component onboard the baler 10, such as a movable component in the form of the driveline 50, as described above. Alternatively, the APS 52 can scavenge power from other movable components onboard the baler 10 that move in a linear and/or rotational manner. For example, the APS 52 can scavenge power from a different movable component in the form of the crank arm 40, other rotating shafts on the baler 10, etc. With the APS 52 of the present invention, power can be stored in the form of electrical and/or hydraulic power within the power storage device(s) 56. This same power can be transferred back to the driveline 50, as described above, and/or alternatively can be used to power one or more functional components 100 onboard the baler 10. The term "functional component", as used herein, is intended to broadly mean a single functional component or a number of functional components (e.g., assembly, subsystem or system) which function to carry out a particular function on the baler 10. If the stored power is in the form of electrical power, then the functional components 100 can be electric motors, lights, linear or rotary actuators, controller(s), sensor(s), fans or other types of electrically powered components. If the stored power is in the form of hydraulic power, then the functional components 100 can be hydraulic rotary or linear actuators, such as motors, pumps, cylinder assemblies, fans and/or other types of actuators.

Examples of various functional components 100 which can be separately powered using the power stored within the power storage device(s) 56 can include:

a) knotter fan drive (to clean the knotters);
b) air cleaning devices to inhibit baler contamination (e.g., powering local air cleaning devices to inhibit machine contamination on the stuffer drive, wheel brakes, etc.);
c) knotterstack drive (e.g., pull twine knot from the bill hook);
d) light(s) for field/road operation;
e) bale density cylinders (e.g., electrically driven);
f) power actuators for setting adjustable degrees of freedom (e.g., variable bend actuators in the main bale chamber walls and ceiling);
g) bale eject system;
h) variable position hay dogs in main bale chamber;
i) bale chute cylinder (e.g., to fold chute for transport);
j) power actuators associated with variable configuration pre-compression chamber;
k) power knife insertion system (e.g., full, partial or individual);
l) power actuator for setting machine trip sensitivity (e.g., required to allow machine automation);
m) power actuator to trip a non-mechanical stuffer clutch;
n) power system for flywheel start-up (e.g., start rotation of flywheel from standstill at start-up, which is difficult or impossible for smaller tractors or reposition the plunger to an ideal position before startup to obtain an optimal starting position for the flywheel to drive the plunger);
o) power swath spreader (e.g., reciprocating arm which spreads swath over the width of the rotor/bale chamber);
p) wheel steering component;
q) steering lock/unlock component;
r) sensors;
s) electrical controller or other electrical circuits;
t) pickup unit (e.g., full or partial powering of pickup unit. Examples of partial drive could be the pickup reel, roll from roller windguard, pick-up tine bar, etc.);
u) cooling devices to cool parts of the baler (10); and/or
v) rotor reverse system for unblocking crop material in the pickup.

For example, if the power storage device 56 is configured as one or more batteries, then the electrical power from the batteries can be used to selectively power one or more lights onboard the baler 10 (see "d" above). Alternatively the electrical power from the batteries can be used to power an electrical controller onboard the baler 10 (see "s" above). As another example, if the power storage device 56 is configured as one or more accumulators, and the pickup unit is configured with a hydraulic motor to drive the pickup reel, then the fluid power from the accumulator(s) can be used to drive the hydraulic motor for rotation of the pickup reel (see "t" above). From these examples, it will be readily understood how the other functional components 100 listed above can likewise be powered.

The various functional components 100 can be selectively powered by the APS 52 (using power from the power storage device(s) 56) either on an intermittent or continuous basis, depending on the functional component and as needed. For example, the lights would only be needed at night, and therefore an operator can depress one or more switches in the operator cab of the tractor to turn on the lights on the baler 10. As a further example, fans used to reduce contamination of crop material in various parts of the baler would likely be operated continuously.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural baler, comprising:
   a flywheel;
   a driveline associated with the flywheel and couplable with a power take-off (PTO) of a traction unit;
   a plunger reciprocally movable in a bale chamber during a compression cycle having a compression stroke and a return stroke;
   at least one functional component onboard the baler configured for performing a function on the baler separate from the flywheel and plunger; and
   an auxiliary power system coupled with the driveline, said auxiliary power system being configured for receiving power from the driveline, storing the power, and utilizing the stored power to power the at least one functional component.

2. The agricultural baler of claim 1, wherein the at least one functional component includes at least one of a mechanically driven component, hydraulically driven component and electrically driven component.

3. The agricultural baler of claim 2, wherein the at least one functional component includes at least one of:
   a) knotter fan drive;
   b) air cleaning devices to inhibit baler contamination;
   c) knotterstack drive;
   d) light(s) for field/road operation;
   e) bale density cylinders;
   f) power actuators for setting adjustable degrees of freedom;
   g) bale eject system;
   h) variable position hay dogs in main bale chamber;
   i) bale chute cylinder;
   j) power actuators associated with pre-compression chamber;
   k) power knife insertion system;
   l) power actuator for setting machine trip sensitivity, required to allow machine automation;
   m) power actuator to trip a non-mechanical stuffer clutch;
   n) power system for flywheel start-up;

o) power swath spreader;
p) wheel steering component;
q) steering lock/unlock component;
r) sensors;
s) electrical controller; and
t) pickup drive.

4. The agricultural baler of claim 1, wherein each of the at least one functional components can be respectively powered intermittently or continuously.

5. The agricultural baler of claim 1, wherein said auxiliary power system is configured for receiving power from the driveline during a portion of the compression cycle.

6. The agricultural baler of claim 1, wherein the auxiliary power system includes:
   a power generation device for receiving power from the driveline and generating power;
   a power storage device coupled with and storing power from the power generation device; and
   a power feedback device for transmitting the stored power back to the driveline.

7. The agricultural baler of claim 6, wherein the power storage device is a hydraulic accumulator, the power generation device includes a hydraulic machine working as a hydraulic pump, and the power feedback device is derived by the hydraulic machine functioning as a motor when transmitting the stored power back to the driveline.

8. The agricultural baler of claim 6, wherein the power storage device includes a capacitor or a battery, the power generation device includes an electric machine functioning as an electric motor, and the power feedback device is derived by the electric machine functioning as an electric generator when transmitting the stored power back to the driveline.

9. A method of operating an agricultural baler, the baler including a flywheel, a driveline associated with the flywheel and couplable with a power take-off (PTO) of a traction unit, a plunger reciprocally movable in a bale chamber during a compression cycle having a compression stroke and a return stroke, and at least one functional component onboard the baler configured for performing a function on the baler separate from the flywheel and plunger, the method comprising the steps of:
   receiving power from the driveline at an auxiliary power system coupled with the driveline;
   generating hydraulic or electric power, based on the received power;
   storing the generated power within the auxiliary power system; and
   powering the at least one functional component using the stored power.

10. The method of claim 9, wherein the at least one functional component includes at least one of a mechanically driven component, hydraulically driven component and electrically driven component.

11. The agricultural baler of claim 10, wherein the at least one functional component includes at least one of:
   a) knotter fan drive;
   b) air cleaning devices to inhibit baler contamination;
   c) knotterstack drive;
   d) light(s) for field/road operation;
   e) bale density cylinders;
   f) power actuators for setting adjustable degrees of freedom;
   g) bale eject system;
   h) variable position hay dogs in main bale chamber;
   i) bale chute cylinder;
   j) power actuators associated with pre-compression chamber;
   k) power knife insertion system;
   l) power actuator for setting machine trip sensitivity, required to allow machine automation;
   m) power actuator to trip a non-mechanical stuffer clutch;
   n) power system for flywheel start-up;
   o) power swath spreader;
   p) wheel steering component;
   q) steering lock/unlock component;
   r) sensors;
   s) electrical controller; and
   t) pickup drive.

* * * * *